(12) United States Patent
Sugimoto et al.

(10) Patent No.: US 7,310,628 B2
(45) Date of Patent: Dec. 18, 2007

(54) CONTENT SEARCHING/DISTRIBUTING DEVICE AND CONTENT SEARCHING/DISTRIBUTING METHOD

(75) Inventors: Kazuo Sugimoto, Tokyo (JP); Yoshimi Moriya, Tokyo (JP); Yoshihisa Yamada, Tokyo (JP); Kohtaro Asai, Tokyo (JP); Hirofumi Nishikawa, Tokyo (JP); Tokumichi Murakami, Toyko (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 180 days.

(21) Appl. No.: 10/048,847

(22) PCT Filed: May 16, 2001

(86) PCT No.: PCT/JP01/04074

§ 371 (c)(1),
(2), (4) Date: Feb. 6, 2002

(87) PCT Pub. No.: WO01/97044

PCT Pub. Date: Dec. 20, 2001

(65) Prior Publication Data

US 2002/0107850 A1 Aug. 8, 2002

(30) Foreign Application Priority Data

Jun. 14, 2000 (JP) .............................. 2000-178436

(51) Int. Cl.
*G06F 17/30* (2006.01)
(52) U.S. Cl. ...................... 707/3; 707/2; 707/7; 707/8; 707/9; 707/101; 707/102; 707/103 R; 707/104.1

(58) Field of Classification Search .............. 707/1–10, 707/200–206, 100–104.1
See application file for complete search history.

(56) References Cited

U.S. PATENT DOCUMENTS

| 5,598,557 | A | | 1/1997 | Doner et al. |
| 5,727,159 | A | | 3/1998 | Kikinis |
| 5,915,250 | A | | 6/1999 | Jain et al. |
| 6,055,543 | A | * | 4/2000 | Christensen et al. ..... 707/104.1 |
| 6,334,126 | B1 | * | 12/2001 | Nagatomo et al. ............. 707/4 |
| 6,633,887 | B2 | * | 10/2003 | Suzuki et al. ............... 707/102 |

FOREIGN PATENT DOCUMENTS

EP 1 267 275 A1 12/2002

(Continued)

OTHER PUBLICATIONS

Yatabe et al., pp. 37-42, (Jul. 11, 1996) w/Partial English Translation.

(Continued)

*Primary Examiner*—Isaac Woo
(74) *Attorney, Agent, or Firm*—Birch, Stewart, Kolasch & Birch, LLP

(57) ABSTRACT

User information from a terminal is input to a user information inputting section 8, retrieval keys are input to a retrieval key inputting section 7 and retrieval demanding signal is input to a user demand inputting section 6. A content retrieving section 10 searches a database B based upon the retrieval keys and outputs a retrieval result list to a retrieval result list editing section 11. A terminal ability information acquiring section 9 acquires information about processing ability of the terminal from the user information input to the user information inputting section 8 and the retrieval result list editing section 11 edits the retrieval result list from the content retrieving section 10 based upon its processing ability information, and on the other hand, an output content editing section 13 edits the contents based upon the terminal ability information, and then both sections delivers through their delivering sections 12, 14 to the terminal, respectively.

15 Claims, 12 Drawing Sheets

FOREIGN PATENT DOCUMENTS

| | | |
|---|---|---|
| JP | 7-234876 | 9/1995 |
| JP | 8-277732 A | 10/1996 |
| JP | 10-11570 | 1/1998 |
| JP | 10-091110 A | 4/1998 |
| JP | 11-136394 A | 5/1999 |
| JP | 11-175556 | 7/1999 |
| JP | 11-224256 | 8/1999 |
| JP | 11-328057 | 11/1999 |
| JP | 2000-50032 | 2/2000 |
| JP | 2000-148793 | 5/2000 |
| WO | 98/15091 | 4/1998 |
| WO | WO 98/15091 A1 | 4/1998 |

OTHER PUBLICATIONS

Canadian Office Action, dated Jul. 26, 2004 for Application No. 2,376,266.

Mohan et al., "Adapting Multimedia Internet Content for Universal Access," IEEE Transaction on Multimedia, vol. 1, No. 1, pp. 104-114, IEEE Service Center, Mar. 1999.

Smith et al., "Content-Based Transcoding of Images in the Internet," Image Processing, 1998, ICIP 98, Proceedings, 1998 International Conference on Chicago, IL, USA, vol. 3, pp. 7-11, IEEE Computer Society, Oct. 4, 1998.

Smith et al., "Visually Searching the Web for Content," IEEE Multimedia, vol. 4, No. 3, pp. 12-20, IEEE Computer Society, Jul. 1997.

Aigrain et al., "Content-Based Representation and Retrieval of Visual Media: A State-of-the-Art Review," Multimedia Tools and Applications, vol. 3., No. 3, pp. 179-202, Kluwer Academic Publishers, 1996.

Z. Hong et al., "Multilingual Information Retrieval System," SPIE vol. 2916, pp. 33-44, Nov. 1996, Institute of Electrical Engineers, Stevenage, GB, XP002098141.

Yang et al., Systems, Man, and Cybernetics, 1999 , "Color image retrieval based on textural and chromatic features", vol. 4, pp. 922-927, (Oct. 1999).

\* cited by examiner

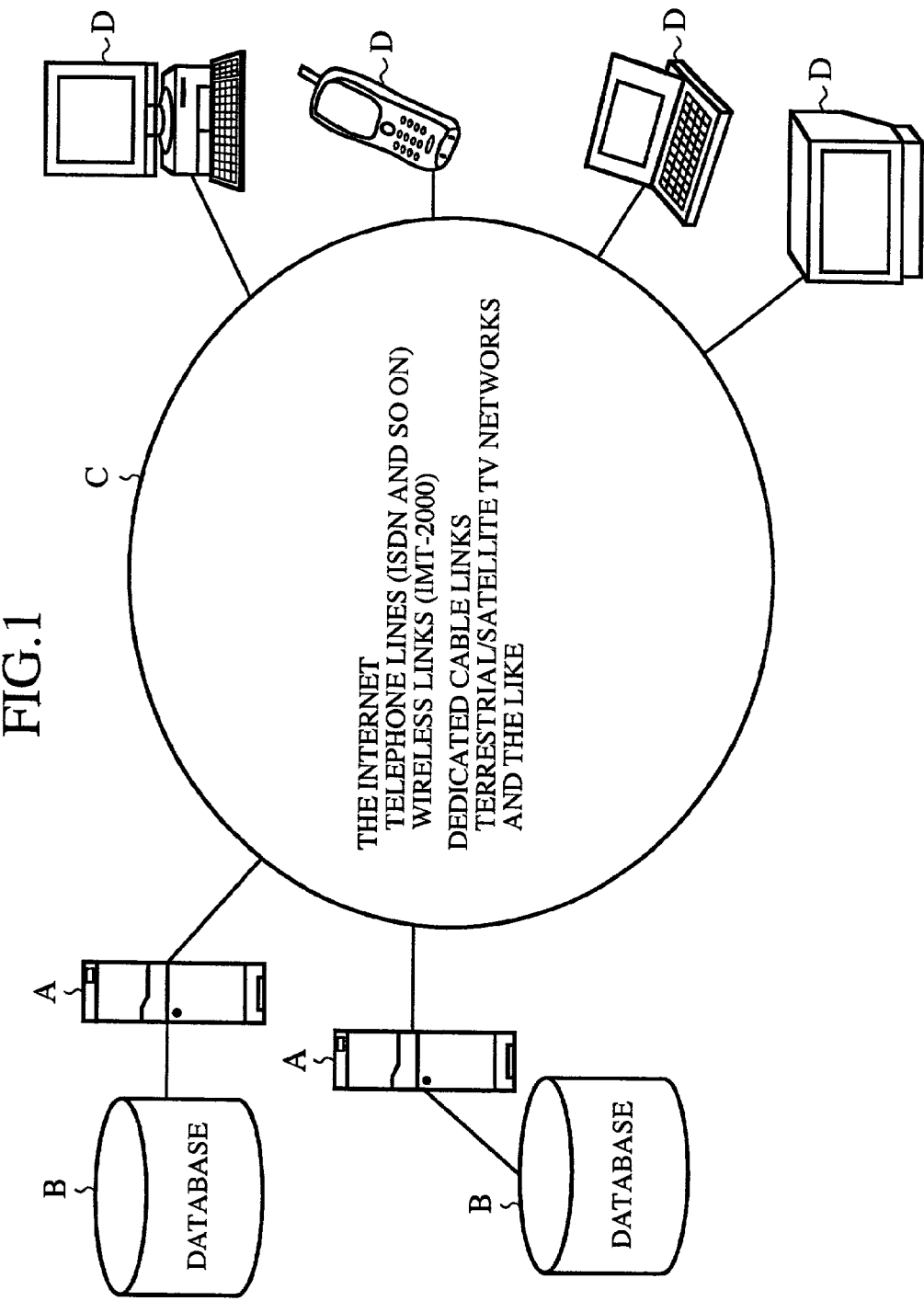

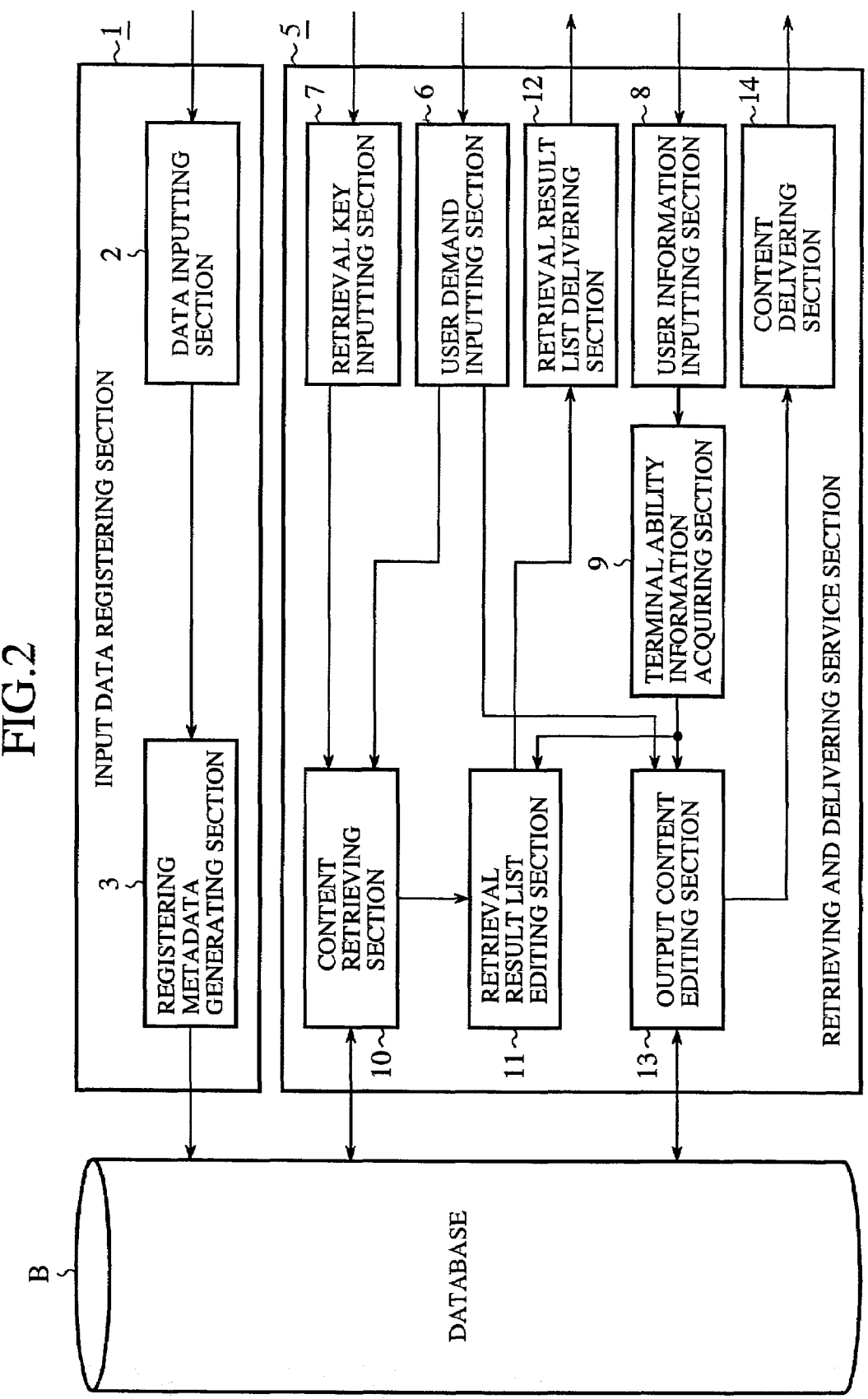

FIG.3

START → INPUT CONTENT TO BE REGISTERED ~ST1 → EXTRACT FEATURES AND ADDITIONAL INFORMATION OF CONTENT ~ST2 → GENERATE METADATA DESCRIBING CONTENT ~ST3 → STORE CONTENT AND METADATA DESCRIBING CONTENT ~ST4 → END

FIG.13

| TYPE OF FEATURES | WEIGHT COEFFICIENT |
|---|---|
| AVERAGED VALUE OF HUE COMPONENTS OF IMAGES | 0.1 |
| AVERAGED VALUE OF CHROMA COMPONENTS OF IMAGES | 0.1 |
| AVERAGED VALUE OF BRIGHTNESS COMPONENTS OF IMAGES | 0.2 |
| HORIZONTAL COMPONENTS OF AVERAGED MOTION VECTORS OF OBJECTS INCLUDED IN IMAGES | 0.3 |
| VERTICAL COMPONENTS OF AVERAGED MOTION VECTORS OF OBJECTS INCLUDED IN IMAGES | 0.3 |

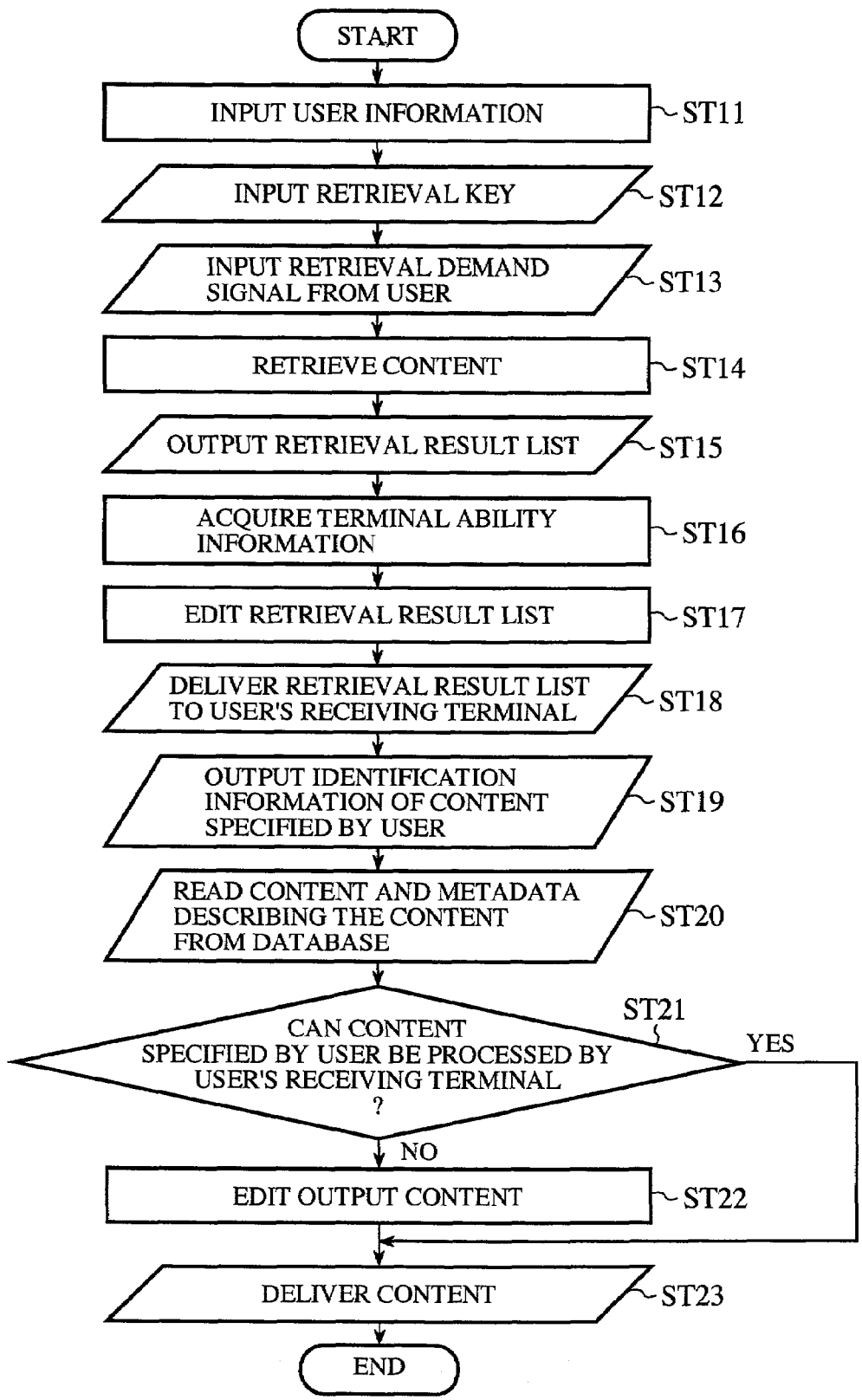

FIG.7
(a) EXAMPLE OF DISPLAY ON PCS AND THE LIKE
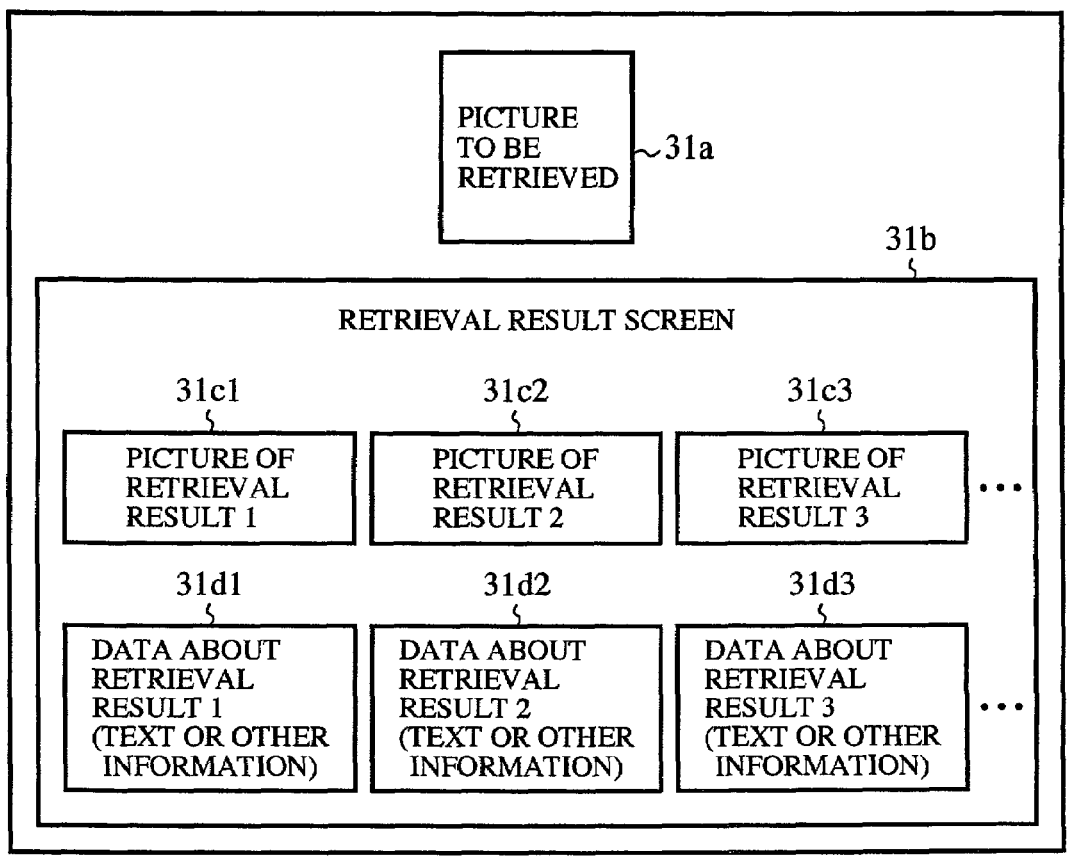
(b) EXAMPLE OF DISPLAY ON CELLULAR PHONES AND THE LIKE
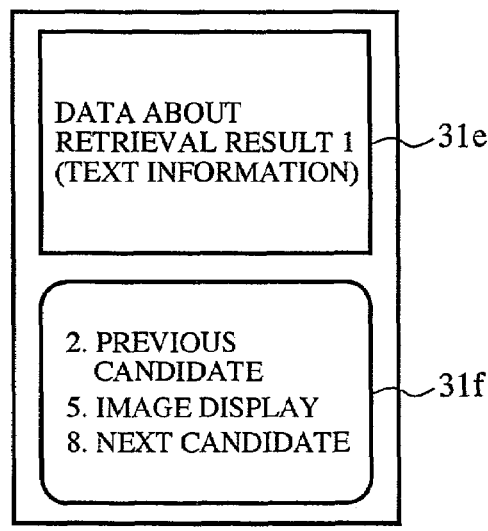

CONTENT SEARCHING/DISTRIBUTING DEVICE AND CONTENT SEARCHING/DISTRIBUTING METHOD

This application is the national phase under 35 U.S.C. § 371 of PCT International Application No. PCT/JP01/04074 which has an International filing date of May 16, 2001, which designated the United States of America.

TECHNICAL FIELD

The present invention relates to an apparatus and a method for retrieving and delivering contents for extracting features and additional information and so on from contents, such as analog or digital recorded image information and so on to generate registering metadata, and then retrieving the contents using such registering metadata, transforming the retrieved contents depending upon processing ability of a terminal and delivering the transformed contents using appropriate telecommunications means depending upon a type of the network to which the terminal is connected.

BACKGROUND ART

One of conventional systems for retrieving and delivering contents on a network is, for example, set forth in "A public image database with the aim of transmitting networked multimedia information: GIRLS" (IPSJ Technical Report, HI67-6, 1996). This system collects images scattered over the Internet, creates a database automatically, and retrieves desired images from the thus created database and delivers the images.

In this system, when the database is searched on the server side, images similar to user demand are retrieved based upon image features registered in the database, and at the user side, the images acquired as a result of the retrieval are browsed on PCs (Personal Computers), workstations and the like.

In the conventional system for retrieving and delivering contents configured in the above-described manner, since it is assumed that terminals that receive the contents acquired as a result of the retrieval are PCs, workstations and the like all interconnected over the Internet, which have nearly identical processing ability and therefore the contents acquired as a result of the retrieval are delivered only in a predefined format, it may have such problems that the contents acquired as a result of the retrieval may not be browsed easily through various different networks, or on various terminals each of which has different processing ability such as, for example, cellular phones, videophones, PCs and so on.

The present invention has been made to solve the above-mentioned problems, and it is an object of the present invention to provide an apparatus and a method for retrieving and delivering contents that can deliver the contents and retrieval result lists acquired as a result of retrieval in appropriate various formats according to various terminals such as, for example, cellular phones, videophones, PCs (Personal Computers) and so on, each of which has different processing ability, by way of various networks such as telephone lines, wireless networks and so on.

SUMMARY OF THE INVENTION

An apparatus for retrieving and delivering a content according to the present invention searches a database where contents and their additional information are stored based upon information from a terminal and delivers data extracted as a result of the search to the terminal, wherein the data extracted as a result of the search is edited depending upon processing ability of the terminal and delivered to the terminal.

It has the effect of enabling the data extracted from the database to be output easily to the various terminals each of which has different processing ability.

The apparatus for retrieving and delivering the content according to the present invention comprises: a content retrieving section that searches the database based upon the information from the terminal, extracts the additional information of the content acquired as a result of the search and outputs a retrieval result list in which the additional information is published; a retrieval result list editing section that, based upon the information from the terminal, edits the retrieval result list obtained from the content retrieving section into any format that can be displayed on a particular terminal depending upon processing ability of the terminal; and a retrieval result list delivering section that delivers the retrieval result list edited by the retrieval result list editing section to the terminal.

It has the effect of enabling the content extracted from the database and the retrieval result list to be output easily to the various terminals each of which has different processing ability.

The apparatus for retrieving and delivering the contents according to the present invention is provided wherein the database stores weighted registering metadata as the additional information, and the content retrieving section searches the database with reference to the registering metadata based upon the information obtained from the terminal and extracts the additional information of the content acquired as a result of the search.

It has the effect of enabling the content extracted from the database and the retrieval result list to be output easily to the various terminals each of which has different processing ability as well as to be retrieved quickly.

The apparatus for retrieving and delivering the content according to the present invention further comprises a retrieving metadata generating section that generates metadata for retrieving a content based upon the information from the terminal and outputs it to the content retrieving section, and in that the content retrieving section searches the database based upon the information from the terminal and the metadata from the retrieving metadata generating section, extracts the additional information of the content acquired as a result of the search, and outputs the retrieval result list in which the additional information is published.

It has the effect of making circuit size of the terminal smaller, since the terminal may not comprise the retrieving metadata generating section.

The apparatus for retrieving and delivering a content according to the present invention comprises: an output content editing section that reads a content from the database based upon the information obtained from the terminal and edits the read content into any format that can be processed on the particular terminal depending upon processing ability of the terminal; and a content delivering section that delivers the content edited by the output content editing section to the terminal.

It has the effect of the contents extracted from the database and the retrieval result list to be output easily to the various terminals each of which has different processing ability.

The apparatus for retrieving and delivering a content according to the present invention is provided wherein the database either stores contents and registering metadata for the particular contents, or stores link information to contents and registering metadata for the particular contents, and the output content editing section further reads the link information from the database based upon the information from the terminal and then reads a content based upon the link information.

It has the effect of enabling the database to register more contents because it stores the link information to the contents instead of the particular contents.

A method for retrieving and delivering a content according to the present invention searches a database where contents and their additional information are stored based upon information from a terminal and delivers data extracted as a result of the search to the terminal, wherein the data extracted as a result of the search is edited depending upon processing ability of the terminal and delivered to the terminal.

It has the effect of enabling the data extracted from the database to be output easily to the various terminals each of which has different processing ability.

BRIEF DESCRIPTION OF THE DRAWINGS

FIG. 1 is a diagram showing the overall configuration of a system for retrieving and delivering contents of the present invention;

FIG. 2 is a diagram showing the configuration of an apparatus A for retrieving and delivering contents according to a first embodiment;

FIG. 3 is a flow chart showing the process of an input data registering section 1 in the apparatus A for retrieving and delivering the contents according to the first embodiment for registering new contents in a database B.

FIG. 4 is a flow chart showing the process of a retrieving and delivering service section 5 in the apparatus A for retrieving and delivering the contents according to the first embodiment;

FIG. 7(a) and FIG. 7(b) are diagrams each showing an example of retrieval results shown on a retrieval result list displaying section 31 of the terminal D;

FIG. 13 is a diagram showing an example of a weight coefficient table in the fourth embodiment.

BEST MODE OF CARRYING OUT THE INVENTION

Figure 5:
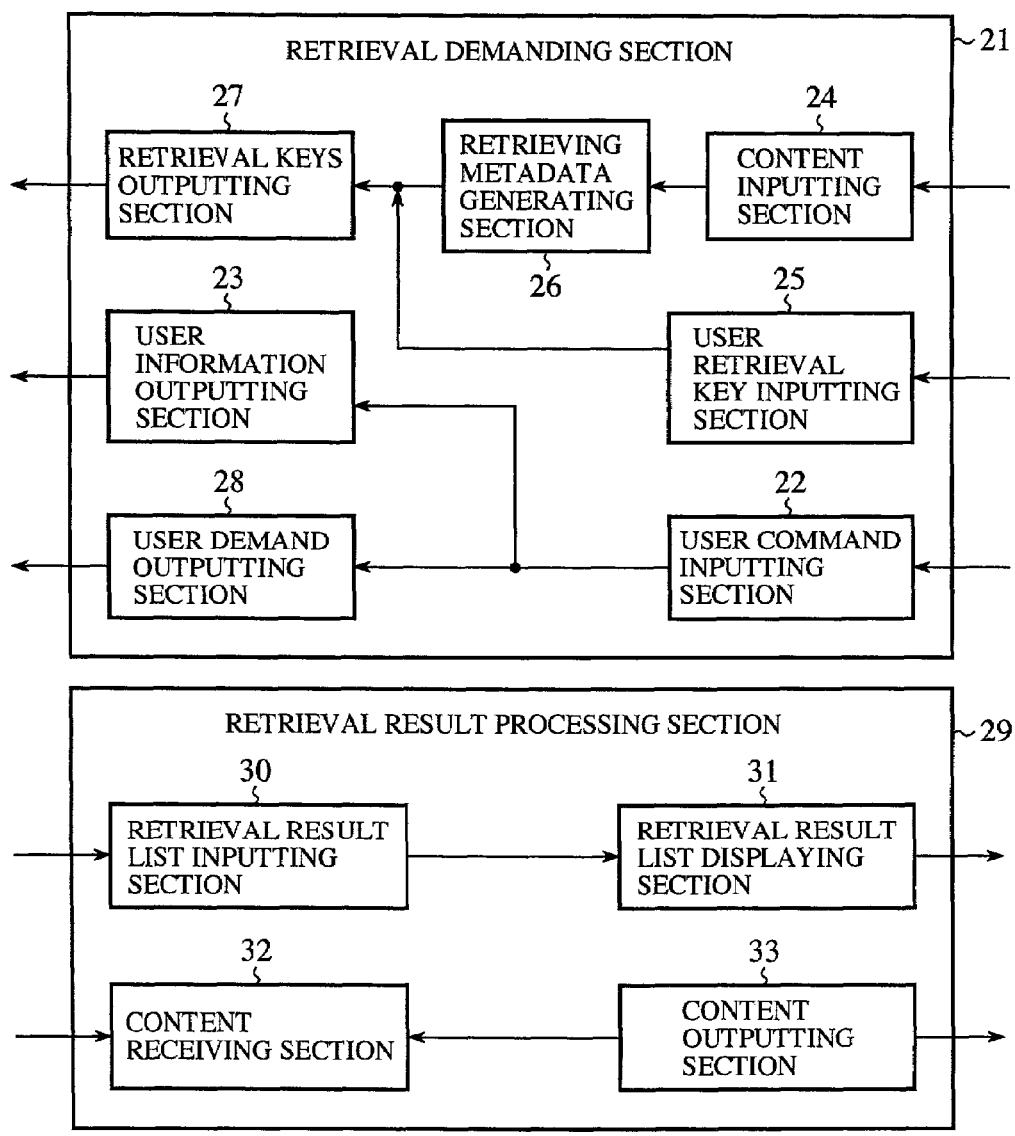
FIG. 5 is a diagram showing the configuration of a terminal D in the system for retrieving and delivering images according to the first embodiment.

Hereinafter, in order to describe the present invention in more detail, the best mode of carrying out the present invention will be described with reference to the accompanying drawings.

First Embodiment

FIG. 1 is a diagram showing an overall configuration of a system for retrieving and delivering a content. In FIG. 1, A designates an apparatus for retrieving and delivering a content according to the present invention that includes a server and so on, B designates a database in which various contents and a registering metadata for the contents are stored, C designates various networks such as Internet, ISDN telephone lines, wireless links, dedicated cable links, terrestrial/satellite TV networks and the like, and D designates various terminals such as PCs, cellular phones, personal digital assistants, digital TV sets and the like that act as clients from a point of view of the apparatus A for retrieving and delivering the content, and each of which has different processing ability.

In such a system for retrieving and delivering the content, for example, terminals D such as PCs and so on can connect to networks C such as the Internet and so on through LANs and so on, other terminals D can connect to the networks C such as the Internet and so on through existing telephone lines such as ISDN and so on, terminals D that have wireless links, such as cellular phones, personal digital assistants and so on can connect to networks C in a wireless manner, and terminals D such as digital TV and so on can connect to networks C such as terrestrial/satellite TV networks and so on.

FIG. 2 is a diagram showing the configuration of the apparatus A for retrieving and delivering the content according to the first embodiment. In FIG. 2, an input data registering section 1 inputs a content, adds a metadata thereto and inputs to the database, a data inputting section 2 inputs a content to be registered in the database B, a registering metadata generating section 3 extracts features and additional information and so on from the content that has been input to the data inputting section 2 and adds the thus extracted information to the content as a registering metadata. At this time, it is to be noted that the registering metadata that has been generated in the registering metadata generating section 3 and the content are stored in the database B.

Here, the registering metadata generating section 3 extracts the "features of a content" including at least any one of, for example, color information of images, texture information of images, motion information, object shape information, frequency response information of sounds, loudness information of sounds, sound source information and language recognition information of sounds. Further, the registering metadata generating section 3 extracts "the additional information about a content" including at least any one of information about image formatting such as a coding method of images, a bit rate of images, a frame rate of images, resolution of images, information about time-space layering of images and so on, a coding method of sounds, a bit rate of sounds, description information about components that make up a content (images, sounds, texts and so on), information about copyright on a content, information about distributing conditions (charged/free of charge and so on), a file size of a content, a filename of a content, an identification number of a content, text information about an author of a content, information about the time of creation of a content, thumbnails of an image, a portion of an image and a portion of sounds.

Further, in FIG. 2, a retrieving and delivering service section 5 retrieves a content that meets user demand from the database B, transforms a list of the content thus acquired as a result of the retrieval depending upon processing ability of the terminal D and outputs the list to the terminal D, and then transforms the content specified by the user into any format that can be processed on the terminal D and delivers the content, a user demand inputting section 6 inputs user demands such as a signal from the terminal D that demands retrieval, identification information about the content that the user demands to be output and so on, a retrieval key inputting section 7 inputs retrieval keys specified by the user from the terminal D, a user information inputting section 8 inputs user identification information and user information about the terminal D from the terminal D, a terminal ability information acquiring section 9 acquires information about processing ability of the terminal D as "terminal ability information" included in the user identification information and the user information about the terminal D input to the user information inputting section 8, and a content retrieving section 10 retrieves the content that is consistent with or similar to the retrieval key input by the retrieval key inputting section 7 from the database B and outputs "a retrieval result list" that is a list of information such as registering metadata about one or more contents selected as a result of the retrieval and so on.

Still further, in FIG. 2, a retrieval result list editing section 11 which edits, based upon the terminal ability information acquired in the terminal ability information acquiring section 9, the retrieval result list output from the content retrieving section 10 into any format that can be displayed on the terminal D and outputs it, a retrieval result list delivering section 12 outputs the retrieval result list that has been edited and output from the retrieval result list editing section 11 to the user, an output content editing section 13 inputs a content from the database B that has been specified by the user via the user demand inputting section 6, inputs the terminal ability information acquired in the terminal ability information acquiring section 9, and edits the content read from the database B by transforming or otherwise processing the content into any format that can be processed on the terminal D and outputs the content, and a content delivering section 14 delivers the edited content output from the output content editing section 13 to the terminal D.

In the embodiment shown in FIG. 2, though the apparatus A for retrieving and delivering the content is comprised of the input data registering section 1 and the retrieving and delivering service section 5, the present invention should not be limited to such configuration, that is, the apparatus A for retrieving and delivering the content may be comprised of the input data registering section 1, the retrieving and delivering service section 5 and the database B, or it may be comprised of the retrieving and delivering service section 5 only.

Next, an operation of the apparatus A for retrieving and delivering the content will be described.

To begin with, a process of the input data registering section 1 will be described in detail.

FIG. 3 is a flow chart showing the process of the input data registering section 1 in the apparatus A for retrieving and delivering the content according to the first embodiment for registering a new content in the database B.

First, the data inputting section 2, which comprises either one or both of an interface for inputting a content via the network C and another interface for inputting a content directly without the network C, inputs the content from outside in either way and outputs the content to the registering metadata generating section 3 (Step ST1).

Here, a new content may be input in various ways, such as by transmitting from the terminal D to the input data registering section 1 via the network C, or by inputting directly in the apparatus A for retrieving and delivering the content that comprises the input data registering section 1 and so on. For example, the content such as images and sounds recorded by a cellular phone equipped with a camera, or the content such as images and sounds received by e-mail and the like may be registered on the apparatus A by transmitting from the terminal D. On the other hand, a content may be input directly via the data inputting section 2 to the apparatus A for retrieving and delivering the content when an output connector of a camera, a video camera, a PC and so on is connected directly to an input connector (not shown) of the apparatus A for retrieving and delivering the content. For such purpose, as discussed above, the data inputting section 2 comprises either one or both of the interface for inputting the content via the network C and the other interface for inputting the content directly without the network C.

The registering metadata generating section 3 extracts information such as features, additional information and the like from the read content (Step ST2). Here, the extracted features may include, for example, color, texture, motion and shape of images in the read content, frequency characteristics of sounds in the read content and so on. Further, keywords describing features of the read content and additional information about the read content may be added.

Here, the additional information may include, for example, information about image formatting such as a coding method (MPEG-1, MPEG-2, MPEG-4, JPEG, GIF, BMP and so on) of images included in the content, a bit rate, a frame rate, resolution, information about time-space layering and so on, a coding method (GSM-AMR, MPEG-1, MPEG2, MPEG-4 and so on) and a bit rate of sounds included in the content, descriptions of components that make up the content (images, sounds, texts, software), information about copyright on the content, information about distributing conditions of the read content (charged/free of charge and so on), a file size of the content, a filename, an identification number, information about the author, information about the time of creation of the content, thumbnails of the images included in the content, a portion of images, a portion of sounds and the like.

Then, the registering metadata generating section 3, using the features of the content and the additional information and so on extracted in an above-described manner, generates registering metadata (a feature descriptor) that is described in a predefined format, such as, for example, a format defined by MPEG-7 and the like (Step ST3), adds the thus generated registering metadata to the corresponding content, and stores the content and the registering metadata in the database B (Step ST4).

Next, the process of the retrieving and delivering service section 5 will be described in detail.

FIG. 4 is a flowchart showing the process of a retrieving and delivering service section 5 in the apparatus A for retrieving and delivering the content according to the first embodiment.

First, information about the user is input from the terminal D to the user information inputting section 8 (Step ST11).

The information about the user may include, for example, user identification information such as a user name, a user registration number, the name of a group which the user belongs to and so on, the type of the terminal D, information about the processing ability of the terminal D and so on.

Next, retrieval keys are input from the terminal D to the retrieval key inputting section 7 (Step ST12), and then a signal that demands retrieval is input from the terminal D to the user demand inputting section 6 (Step ST13). Here, the retrieval keys may include, for example, a keyword, the registering metadata describing the features of the content and the additional information, a file format of images, sounds and other data included in the content, resolution, a file size and so on.

When the retrieval demanding signal and the retrieval keys are input, the content retrieving section 10 matches the retrieval key with the keyword and the features described in the registering metadata contained in the database B (Step ST14), retrieves one or more contents that are consistent with or similar to the retrieval key, extracts the additional information such as the registering metadata and the like, which are stored along with the one or more contents thus acquired as a result of the retrieval, and outputs it as the retrieval result list to the retrieval result list editing section (Step ST15).

Here, information published in the retrieval result list may include, for example, information about image formatting such as a coding method of images included in the content (MPEG-1, MPEG-2, MPEG-4, JPEG, GIF, BMP and so on), a bit rate, a frame rate, resolution, information about time-space layering and so on, a coding method (GSM-AMR, MPEG-1, MPEG-2, MPEG-4 and so on) and a bit rate of sounds included in the contents, descriptions of components that make up a content (images, sounds, texts, software), information about copyright on the a content, information about distributing conditions of the read content (charged/free of charge and so on), a file size of the content, a filename, an identification number, information about the author, information about the time of creation of the content, thumbnails of the images included in the content, a portion of images, a portion of sounds and the like.

Next, the terminal ability information acquiring section 9 acquires terminal ability information about processing ability of the terminal D that is included in the user information input to the user information inputting section 8 from the terminal D, and outputs it to the retrieval result list editing section 11 (Step ST16). At this time, though it is assumed that the terminal ability information is acquired from the terminal D in the first embodiment, the present invention should not be limited to such configuration, that is, for example, if the apparatus A for retrieving and delivering the content has a user registration function, information about the receiving terminal of the user may be registered in the apparatus A upon user registration in advance, and the terminal ability information registered in the apparatus A for retrieving and delivering the content may be acquired by referring to the user identification information. Here, the terminal ability information may include a coding method of images used in the terminal D, resolution of images that can be received and displayed on the terminal D, a bit rate, a frame rate, a coding method of sounds used in the terminal D, a bit rate of sounds that can be received and displayed or otherwise can be output on the terminal D and the like.

Then, since the retrieval result list editing section 11 also inputs the retrieval result list that has been output from the content retrieval section 10, the retrieval result list editing section 11, based upon the terminal ability information from the terminal ability information acquiring section 9, edits the retrieval result list, that is, extracts only the information that can be received and displayed or otherwise output on the terminal D out of the information included in the retrieval result list from the content retrieval list 10 and so on, and outputs the edited retrieval result list to the retrieval result list delivering section 12 (Step ST17), and then, the retrieval result list delivering section 12 delivers the retrieval result list that has been edited by the retrieval result list editing section 11 to the terminal D that has demanded retrieval of the content (Step ST18).

The information that has been published in the retrieval result list and delivered to the terminal D may include, for example, a file name of the content that has been extracted as a result of the retrieval, the name of a coding method of images in the extracted content, and JPEG or other coded thumbnail images, and so on. However, if the terminal D such as, for example, a cellular phone terminal, does not have the function to decode and display JPEG or other coded images at present, the JPEG or other coded thumbnail images may be excluded from the retrieval result list, and the retrieval result list may be edited so that it includes only information that can be displayed on the terminal D like the cellular phone terminal and so on, such as a file name of a content, the name of a coding method of images of a content and so on, and such retrieval result list may be delivered to the terminal D.

When the retrieval result list is displayed on the terminal D, the user sends user's demand that specifies particular content out of the contents listed in the retrieval result list using the content identification information to the apparatus A for retrieving and delivering the content via the network C.

Then, in the apparatus A for retrieving and delivering the content, the user demand inputting section 6 in the retrieving and delivering service section 5 inputs the user demand from the terminal D and outputs it to the output content editing section 13 (Step ST19).

The output content editing section 13 reads the content specified by the content identification information that has been input from the user demand inputting section 6 as well as the registering metadata for the specified content (Step ST20), determines whether or not the thus read content can be received and displayed or can be otherwise output on the terminal D that has sent the user demand, on the basis of the terminal ability information about the terminal D concerned (Step ST21).

Here, if the output content editing section 13 determines that the content read from the database B can be received and displayed or otherwise can be output on the terminal D without further editing (Step ST21 "Yes"), it outputs the relevant content read from the database B to the content delivering section 14. Then, the content delivering section 14 delivers the content output from the output content editing section 13 to the terminal D (Step ST23).

In contrast to this, if the output content editing section 13 determines that the content read from the database B can not be received and displayed or otherwise output on the terminal D (Step ST21 "No"), it edits the content read from the database B by transforming or otherwise processing the content into a form that can be received and displayed or can be otherwise output on the terminal D (Step ST22), and then outputs the edited content to the content delivering section 14. At this time, the transforming process performed in the output content editing section 13 may include conversion of a coding method, resolution, a bit rate, frame rate of images, conversion of a coding method, bit rate of sounds and the like. Alternatively, a process to extract a portion of the content may be performed as needed: for example, if the content is composed of images and sounds and the terminal D does not support sound data, only the images included in the content may be extracted. Or, if, for example, the content is layered data that is composed of a base layer and an enhancement layer and the terminal D supports the base layer only and does not support the enhancement layer, only the base layer may be extracted.

The content delivering section 14 delivers the content that has been transformed into a form that can be received and displayed or otherwise output on the terminal D as described above to the terminal D (Step ST23).

FIG. 5 is a diagram showing the configuration of a terminal D in the system for retrieving and delivering images in the first embodiment.

In FIG. 5, a retrieval demanding section 21 inputs retrieval keys and user commands from the user, extracts features and additional information out of the thus read content and adds them to the retrieval key as a registering metadata, and sends the terminal ability information, the retrieval keys and the user commands to the apparatus A for retrieving and delivering the content, a user command inputting section 22 inputs user demands, such as a user command to demand retrieval, identification information of the content, the output of which the user demands, and so on, a user information outputting section 23 outputs user identification information and user information about the terminal D, a content inputting section 24 captures a content to be retrieved, which is comprised of images, sounds and so on from a digital video camera and the like, and a user retrieval key inputting section 25 inputs user retrieval keys specified by the user.

Further, in FIG. 5, a retrieving metadata generating section 26 extracts features, additional information and so on of the content to be retrieved, which have been input from the content inputting section 24 and outputs them as a registering metadata, a retrieval key outputting section 27 outputs, as retrieval keys, the user retrieval keys that have been input in the user retrieval key inputting section 25 and the registering metadata that has been generated in the retrieving metadata generating section 26 to the apparatus A for retrieving and delivering the content, and a user demand outputting section 28 outputs user demands such as a signal by which the user demands retrieval, identification information of the content, the output of which the user demands, and the like to the apparatus A for retrieving and delivering the content.

Still further, in FIG. 5, a retrieval results processing section 29 receives information acquired as a result of the retrieval performed by the apparatus A for retrieving and delivering the content and outputs the information to the user, a retrieval result list inputting section 30 receives a retrieval result list acquired as a result of the retrieval by the apparatus A for retrieving and delivering the content from the apparatus A, a retrieval result list displaying section 31 displays the retrieval result list input from the retrieval result list inputting section 30, a content receiving section 32 receives a content that is listed in the retrieval result list and specified by the user from the apparatus A for retrieving and delivering the content, and a content outputting section 33 displays the content received in the content receiving section 32 to the user or outputs in the form of sounds and the like. At this time, in the above description of the first embodiment, though the terminal D is equipped with both the retrieval demanding section 21 and the retrieval results processing section 29, the present invention should not be limited to such configuration, and the retrieval demanding section 21 and the retrieval results processing section 29 may be, of course, included in different terminals D separately.

Next, the process of the terminal D of the first embodiment of the present invention will be described in detail.

Figure 6:
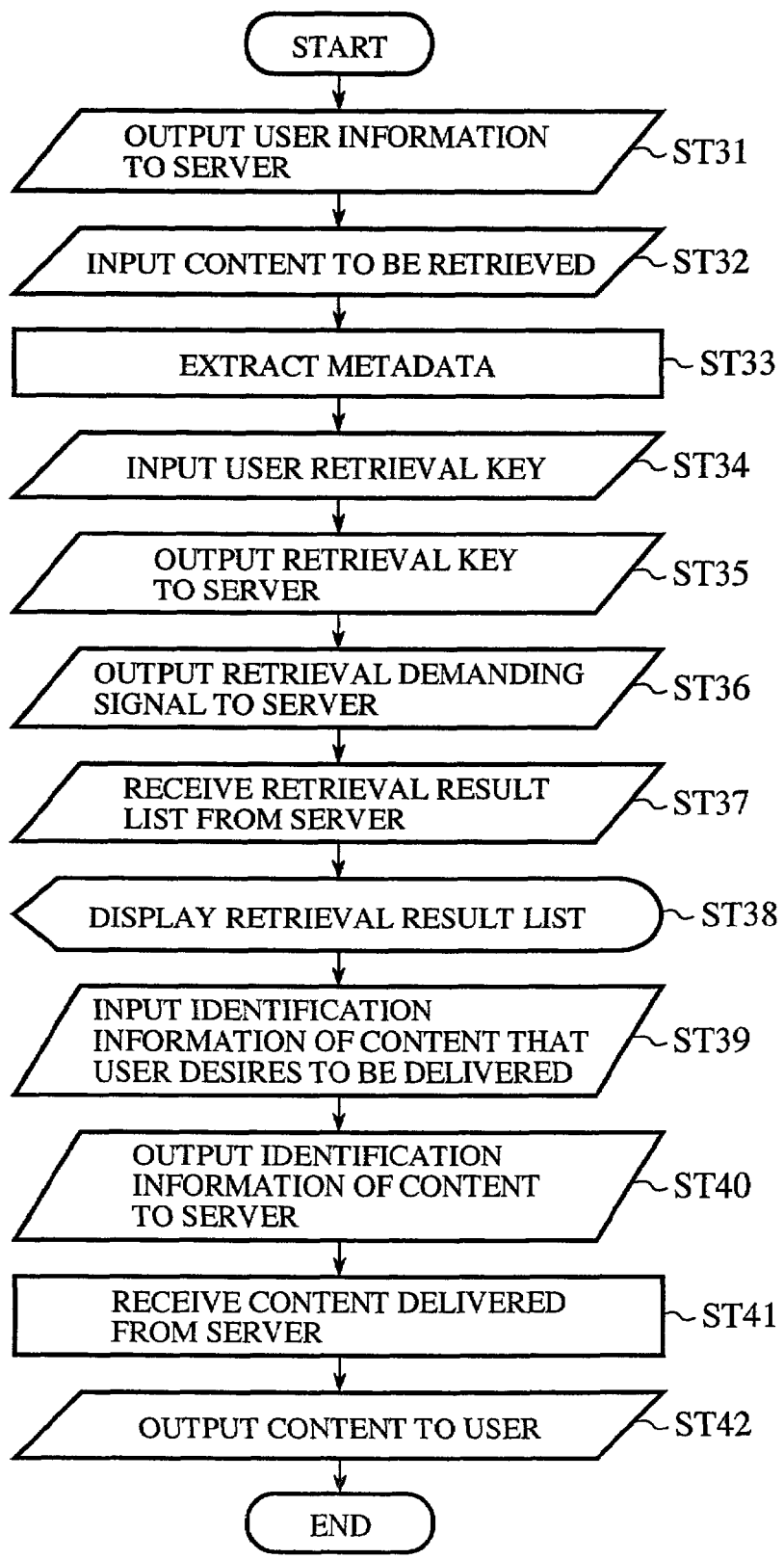
FIG. 6 is a flow chart showing the process of the terminal D in the system for retrieving and delivering the contents according to the first embodiment.

FIG. 6 is a flowchart showing the process of a terminal D in the system for retrieving and delivering the content according to the first embodiment.

When the terminal D is connected to the apparatus A for retrieving and delivering the content acting as a server via the network C through manipulation of the terminal D or other operation by the user, user information is at first sent from the user information outputting section 23 of the terminal D to the apparatus A for retrieving and delivering the content (Step ST31). The user information may include user identification information, the type of the terminal D, information about processing ability of the terminal D and the like. Here, the user information is input by the user command inputting section 22, wherein it can be arranged such that the user information is input by the user command inputting section 22 after the terminal D has been connected to the apparatus A for retrieving and delivering the content and at the same time it may be sent to the apparatus A for retrieving and delivering the content, or alternatively, of course, the apparatus A may be configured so that the user information may be input by the user command inputting section 22 in advance and stored in the user information outputting section 23 and then, upon connection to the apparatus A for retrieving and delivering the content, it may be sent to the apparatus A for retrieving and delivering the content by the user information outputting section 23.

Next, the user inputs the content to be retrieved to the content inputting section 24 of the terminal D (Step ST32). Here, the input content such as images, sounds and the like may be captured directly from a digital video camera, a microphone and the like, or through the network C or in other manner.

The content that has been input to the content inputting section 24 are output to the retrieving metadata generating section 26, and the retrieving metadata generating section 26 extracts features, additional information and so on of the content to be retrieved and outputs them as the registering metadata to the retrieval key outputting section 27 (Step ST33). The features extracted in the retrieving metadata generating section 26 may include, for example, color, texture, motion and shape of images in the content to be retrieved, frequency response of sounds in the read content and so on. On the other hand, the additional information extracted in the retrieving metadata generating section 26 may include, for example, a coding method (MPEG-1, MPEG-2, MPEG-4, JPEG, GIF, BMP and so on), a bit rate, a frame rate, resolution of the images included in the content to be retrieved, and a coding method (GSM-AMR, MPEG-1, MPEG-2, MPEG-4 and so on), a bit rate and the like of the sounds included in the content.

Next, user retrieval keys specified by the user are input to the user retrieval key inputting section 25 and then output to the retrieval key outputting section 27 (Step ST34). The user retrieval keys may comprise, for example, a keyword for the content, a filename, a file size, information about the time of creation of the content, rough information about the color, texture, motion and shape of the content, rough frequency response of the sounds and the like.

Then, when the registering metadata generated in the retrieving metadata generating section 26 and the user retrieval keys input from the user retrieval key inputting section 25 are output to the retrieval keys outputting section 27 as "retrieval keys", the retrieval key outputting section 27 outputs the retrieval keys consisting of the registering metadata and the user retrieval keys via the network C to the apparatus A for retrieving and delivering the content acting as the server (Step ST35).

On the other hand, when the user inputs a command for demanding retrieval to the apparatus A for retrieving and delivering the content via the user command inputting section 22, the retrieval demanding signal is sent to the apparatus A for retrieving and delivering the content via the user demand outputting section 28 (Step ST36). Here, operation to output each of the information from the terminal D in these Steps ST31, 35 and 36 may be performed in any order that is not limited to the above description.

Then, when the apparatus A for retrieving and delivering the content receives the retrieval demanding signal, the registering metadata and the user retrieval keys that have been sent via the network C from the terminal D through manipulation by the user, it retrieves the content on the database B based upon the retrieval keys sent by the user as described above. The retrieval result list that has been generated as a result of the retrieval by the apparatus A for retrieving and delivering the content is sent via the network C to the terminal D as described above, and in the terminal D, the retrieval result list inputting section 30 in the retrieval results processing section 29 receives the retrieval result list that has been sent from the apparatus A for retrieving and delivering the content (Step ST37).

The retrieval result list inputting section 30 displays the received retrieval result list on the retrieval result list displaying section 31 to allow the user of the terminal D to browse the retrieval result list (Step ST38).

The user, referring to the retrieval result list displayed on the retrieval result list displaying section 31, selects the content which the user desires to be delivered in the retrieval result list and inputs the identification information of the selected content to the user command inputting section 22 of the terminal D (Step ST39).

Then, the identification information of the content that has been input to the user command inputting section 22 is output from the user demand outputting section 28 and sent via the network C to the apparatus A for retrieving and delivering the content acting as the server (Step ST40).

As described above, the apparatus A for retrieving and delivering the content reads the content specified by the user according to the content identification information received from the user and delivers the content to the terminal D of the pertinent user.

As a consequence, the content that has been delivered from the apparatus A for retrieving and delivering the content is received in the content receiving section 32 of the terminal D of the pertinent user (Step ST41), and is output to the user by the content outputting section 33 in any outputting format depending upon each media such as images, sounds and so on (Step ST42). At this time, the contents may be displayed on the retrieval result list displaying section 31 along with or aside from the retrieval result.

Next, by way of example, an operation of the system for retrieving and delivering the content according to the first embodiment will be described in a case where the apparatus A for retrieving and delivering the content in which a video content on sports are stored is accessed and searched to seek tee shot scenes of various golfers and information about the golfers (names of the golfers, front facial portrait images, birthplaces, average scores, international rankings, awards that the golfers have received and the like) that will be extracted as a result of retrieval with reference to a tee shot scene at golf shot by a digital video camera and the like.

In this example, let us assume that scenes similar to the tee shot scene at golf taken by the terminal D will be retrieved.

First, as discussed above, when the terminal D is connected to the apparatus A for retrieving and delivering the content via the network C, various user information including the user identification such as, for example, a log-in name to access to the apparatus A for retrieving and delivering the content and so on, and information about processing ability of the terminal D, such as, for example, about the fact that it can receive and display images of MPEG-4 coding format and of 176×144 pixels in size and it can receive and output sounds of GSM-AMR or other coding formats and so on are sent from the user information outputting section 23 of the terminal D to the apparatus A for retrieving and delivering the content via the network C.

Then, the user information about the terminal D is input to the user information inputting section 8 of the apparatus A for retrieving and delivering the content, and the terminal ability information acquiring section 9 acquires the terminal ability information about the terminal D from the user information of the terminal D input to the user information inputting section 8.

On the other hand, an image shot or otherwise acquired by the terminal D using a camera or other means (not shown) installed in itself or in other apparatus is input to the content inputting section 24 of the terminal D that may be a cellular phone and the like. The image input to the content inputting section 24 is sent to the retrieving metadata generating section 26 that extracts features included in the entire image or objects within the image, such as shape, color, motion, texture and the like and sends the features to the retrieval key outputting section 27 as a registering metadata.

Further, certain conditions such as, for example, that "the content extracted as a result of the retrieval should not be constrained by any distributing condition" or "the content extracted as a result of the retrieval should include a video content of the golfers in place not lower than tenth in international ranking only" and so on are input to the user retrieval key inputting section 25 as the user input retrieval keys, and the user input retrieval keys are sent to the retrieval key outputting section 27.

Still further, when the user inputs a retrieval demanding command to the user command inputting section 22, a retrieval demanding signal is sent from the user demand outputting section 28 to the user demand inputting section 6 of the apparatus A for retrieving and delivering the content, and then, the registering metadata and the user retrieval keys output from the retrieval key outputting section 27 are sent to the retrieval key inputting section 7 of the apparatus A for retrieving and delivering the content as the retrieval keys.

The content retrieving section 10 of the apparatus A for retrieving and delivering the content, based upon the registering metadata and the user retrieval keys input to the data inputting section 2 from the terminal D, performs matching of the features described in the registering metadata stored in the database B with the features described in the retrieval keys, and consequently, extracts information only from the video content that have features consistent with or similar to the registering metadata and the user retrieval keys from the terminal D and satisfy the conditions specified in the retrieval keys.

The information about the video content extracted here may include, for example, the first one frame image of the video content, a registration number of the video content, a filename, a file size, a coding method of images and sounds, resolution, a bit rate and a frame rate of images, a bit rate of sounds, text data describing the video content and so on. Such information about the video content is sent to the retrieval result list editing section 11 as the retrieval result list.

As described above, the retrieval result list editing section 11 edits the retrieval result list by transforming or otherwise processing the list depending upon the ability of the terminal D.

The retrieval result list edited by the retrieval result list editing section 11 is sent from the retrieval list delivering section 12 to the terminal D via the network C and input to the retrieval result list inputting section 30 of the terminal D. The retrieval result list that has been input to the retrieval result list inputting section 30 is displayed by the retrieval result list displaying section 31.

In FIG. 7(a) and FIG. 7(b), there is shown an example of the retrieval results displayed by the retrieval result list displaying section 31 of the terminal D.

FIG. 7(a) shows an example of the retrieval result list displayed on the retrieval result list displaying section 31 of the terminal D such as a PC and the like, which has sufficient ability to display and process the list. In FIG. 7(a), reference numeral 31a denotes an image to be retrieved that has been input by the user via the content inputting section 24 and the like, and that may be, for example, a putting scene at golf and the like. Reference numeral 31b denotes a screen for the retrieval results acquired as a result of the retrieval by the content retrieving section 10 and sent from the retrieval result list editing section 11 of the apparatus A for retrieving and delivering the content, wherein 31c1-31c3 are pictures of the retrieval results 1, 2, 3, . . . that are displayed on the screen 31b for the retrieval result and that may be thumbnails or other images of a plurality of putting scenes at golf that have been acquired as a result of the retrieval and displayed on the retrieval results screen 31a and are consistent with or similar to the images 31a to be retrieved, and 31d1-31d3 are data comprised of text or other information about the retrieval results 1, 2, 3, . . . corresponding to the pictures 31c1-31c3 of the retrieval results 1, 2, 3, . . . , respectively, that may be data on the golfers who are putting in the pictures such as, for example, names of the golfers, front facial portrait images, birthplaces, average scores, international rankings, awards that the golfers have received and so on.

FIG. 7(b) shows an example of retrieval result list displayed on the retrieval result list displaying section 31 when the retrieval result list has been sent to the terminal D that has a smaller display screen, or to which larger information cannot be downloaded due to its heavy load. In this case, as shown in FIG. 7(b), for example, there is shown data 31e comprised of text or other information about the retrieval result 1 (the golfer 1) within the retrieval result list in conjunction with selecting buttons including a "previous candidate" button to call up data on the previous candidate, e.g. the retrieval result 0 (the golfer 0), a "next candidate" button to call up data on the next candidate, e.g. the retrieval result 2 (the golfer 2), an "image display" button to allow the image of the presently displayed retrieval result 1 (the golfer 1) to be appeared, and the like.

With reference to the retrieval result list displayed on the retrieval result list displaying section 31 as described above, the user selects the content that the user desires to be delivered within the displayed retrieval result list and inputs identification information about the selected content to the user command inputting section 22. Here, any means or method that can identify the particular content within the retrieval result list may be used as the content identification information, and therefore, for example, when index or other numbers are added to each of the content information listed in the retrieval result list, the index or other numbers may be used as the identification information.

Then, the content identification information that has been input to the user command inputting section 22 is output from the user demand outputting section 28, sent to the apparatus A for retrieving and delivering the content A via the network C, and input to the user demand inputting section 6 of the apparatus A for retrieving and delivering the content.

The content identification information that has been input to the user demand inputting section 6 is output to the output content editing section 13, and the output content editing section 13 reads the content that the user desires to be delivered from the database B based upon the input content identification information.

Then, the output content editing section 13 transforms the content read from the database B into any format that is suitable for the ability of the terminal D to which the content is to be delivered by transforming the format of the content or otherwise processing the content, based upon the terminal ability information acquired by the terminal ability information acquiring section 9.

By way of example, let us assume that the video content registered in the database B have image data in MPEG-2 coding format in 720×480 pixels resolution and sound data in MPEG-1 Audio Layer 2 coding format. At this time, if the terminal D is a cellular phone that can process image data in MPEG-4 coding format in size of 176×144 pixels as well as sound data in GSM-AMR coding format, the video content should be output in the data format that can be processed by the terminal D by transforming the MPEG-2 coded image data in 720×480 pixels resolution into the MPEG-4 coded image data in 176×144 pixels resolution and the MPEG-1 Audio Layer 2 coded sound data into the GSM-AMR coded sound data. Here, though an example in that the coding method and the resolution should be transformed is described, it is to be noted that the output content editing section 13 may transform a bit rate, a frame rate or other properties of the content.

Further, if a file size of the read content is larger than, for example, an upper limit of the value that is assumed for the terminal D, the output content editing section 13 may send a part of the entire content, for example, by sending only image data in the content comprised of the image data and sound data, cutting out a portion of the image to send, or, if the image data is layered data and comprised of a base layer and an enhancement layer, sending only the data in the base layer, and so on.

Still further, if the user specifies any conditions such as, for example, that "a content to be retrieved must be free of charge and without restriction by copyright", charged content may not be delivered entirely in itself, but only a part of the content that can be delivered at no charge may be extracted. For example, if the content is "movies", a series of typical scenes picked up from the entire movies like "a trailer film" may be a part of the content that can be delivered at no charge.

As described above, the output content editing section 13, based upon the terminal ability information from the terminal ability acquiring section 9, transforms the content read from the database B into any format suitable for the ability of the terminal D by transforming the format of the content or otherwise processing the content, and then the content delivering section 14 delivers the edited or otherwise processed content to the terminal D via the network C.

In the terminal D, when the content receiving section 32 receives the content from the apparatus A for retrieving and delivering the content acting as a server, the received content is output in any outputting format depending upon each media of the content, that is, it may be displayed to the user via the content outputting section 33, or may be output in the form of sounds, and so on.

As described above, according to the first embodiment, the apparatus A for retrieving and delivering the content edits the retrieval result list acquired as a result of the retrieval and the content specified by the user based upon the processing ability of the terminal D so that the retrieval result list and the content can be received, displayed and output by the terminal D of the pertinent user, and therefore, the retrieval result list and the content that the user demands to be delivered may be readily displayed or output by various terminals each of which has different processing ability.

In the first embodiment, though there is described an example wherein a content including images and sounds are retrieved and delivered to the user as a result of retrieval with reference to sample pictures or images that the user shot for the retrieval, the present invention should not be limited to such case, a content comprised of images only may be retrieved and delivered by using sample sounds, or, of course, a content comprised of imaged and sounds may be retrieved and delivered by using sample sounds.

Further, in the first embodiment, though the input data registering section 1, the database B, and the retrieving and delivering service section 5 of the apparatus A for retrieving and delivering the content are described as being disposed in the same apparatus A, the present invention should not be limited to such configuration, that is, each of them may be disposed in different apparatuses A for retrieving and delivering the content.

Still further, instead of generating the registering metadata in the input data registering section 1 as described above, the registering metadata may be generated individually by authors of each content and registered in the database B along with the corresponding content, or, alternatively, on the one hand, registering metadata specifying distributing conditions or other conditions may be generated by the authors of the content, and on the other hand, the other registering metadata describing the features of the content may be generated in the apparatus A for retrieving and delivering the content, and then both may be registered in the database B individually.

Still further, the retrieval demanding section 21 and the retrieval results processing section 29 described in the first embodiment may be disposed in different terminals D respectively.

Second Embodiment

Though the apparatus A for retrieving and delivering the content according to the first embodiment that retrieves the content by using the registering metadata generated in the retrieving metadata generating section 26 of the terminal D is described, an apparatus A for retrieving and delivering content according to a second embodiment is configured to comprise a similar retrieving metadata generating section in the apparatus A for retrieving and delivering the content so that it generates the registering metadata in the apparatus A for retrieving and delivering the content and retrieves the content by using the generated registering metadata.

Figure 8:
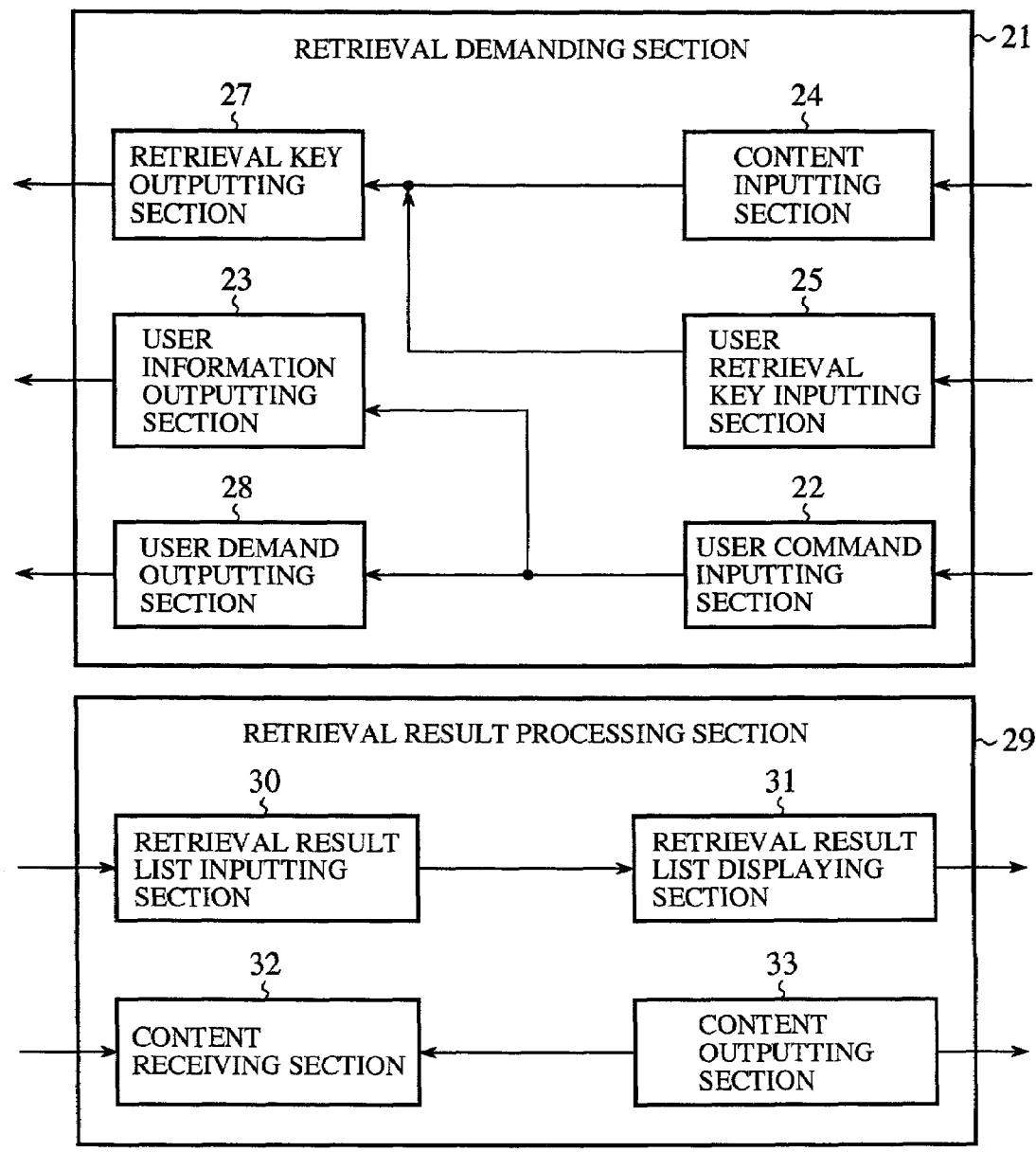
FIG. 8 is a diagram showing the configuration of the terminal D that corresponds to the apparatus A for retrieving and delivering the contents according to a second embodiment.

FIG. 8 is a diagram showing the configuration of a terminal D that corresponds to the apparatus A for retrieving and delivering the content of the second embodiment. In contrast to the terminal D of the first embodiment shown in FIG. 5, the terminal D that corresponds to the apparatus A for retrieving and delivering the content of the second embodiment is configured such that it does not comprise the retrieving metadata generating section 26 and therefore the content to be retrieved that are input through the content inputting section 24 are sent to the apparatus A for retrieving and delivering the content via the retrieval key outputting section 27 along with the user retrieval keys.

Figure 9:
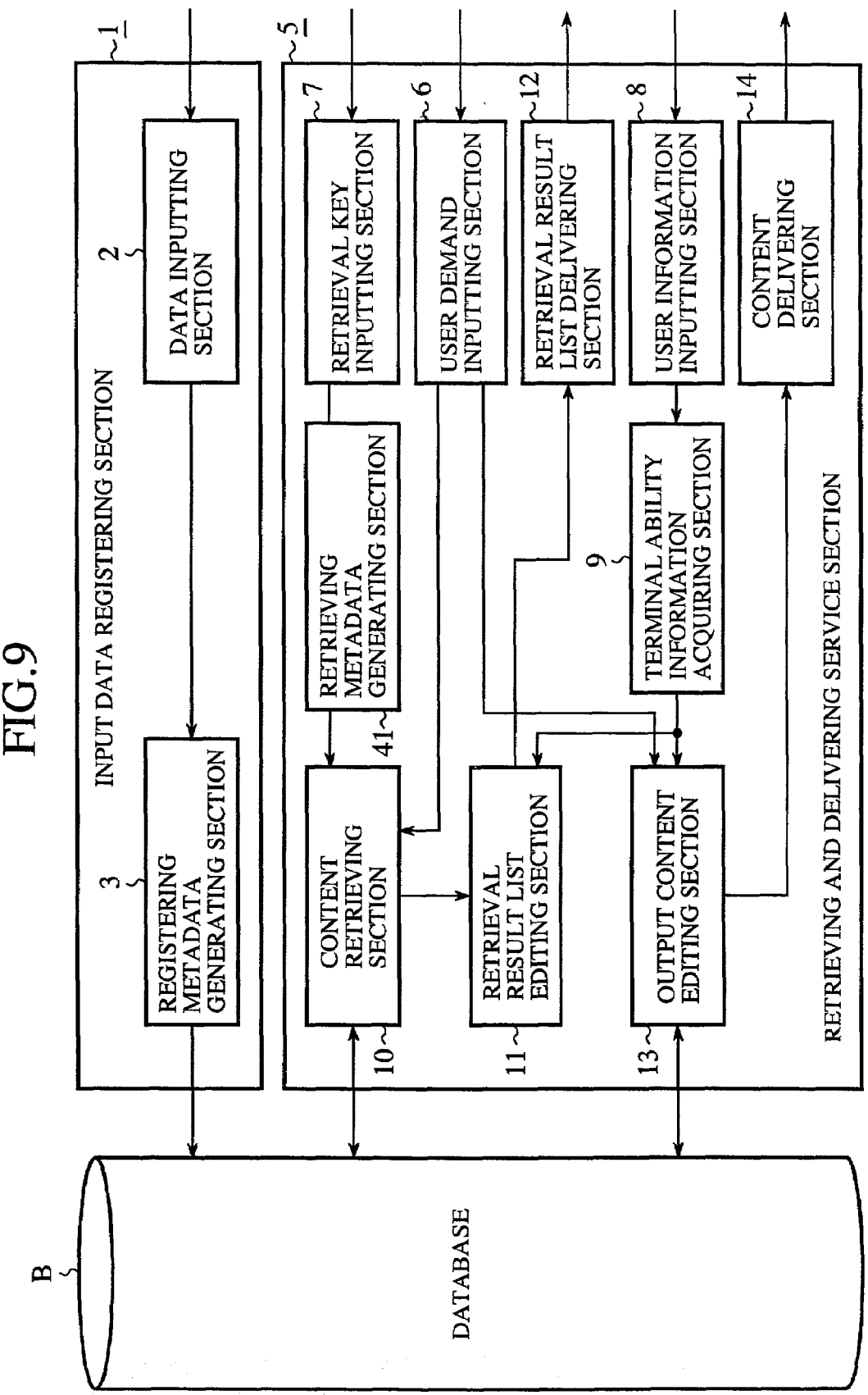
FIG. 9 is a diagram showing the configuration of the apparatus A for retrieving and delivering the contents according to the second embodiment.

FIG. 9 is a diagram showing the configuration of the apparatus A for retrieving and delivering the content in the second embodiment. A retrieving metadata generating section 41 extracts features and additional information of the to be retrieved from the retrieval keys input through the retrieval key inputting section 5 and outputs the extracted information as the registering metadata for retrieval. Since other elements are similar to the ones in the apparatus A for retrieving and delivering the content of the first embodiment shown in FIG. 2, like elements are given like reference numerals and description of these elements is omitted.

Next, an operation of the apparatus A will be described.

In the apparatus A for retrieving and delivering the content in the second embodiment, the retrieval key inputting section 7 of the retrieving and delivering service section 5 receives the retrieval keys from the terminal D via the network C and outputs the retrieval keys to the retrieving metadata generating section 41. Here, the retrieval keys received by the retrieving key inputting section 5 from the terminal D may include the user retrieval keys and the content to be retrieved.

The retrieving metadata generating section 41 extracts the features and the additional information of the content to be retrieved from the retrieval keys input through the retrieval key inputting section 5 and outputs the extracted information to the content retrieving section 10 along with the user retrieval keys as the registering metadata for retrieval.

The content retrieving section 10 inputs the registering metadata and the user retrieval keys from the registering metadata generating section 41, and then, as in the case of the first embodiment described above, based upon the registering metadata and the user retrieval keys, searches the database B to extract information about the pertinent video content, and outputs the extracted information to the retrieval result list editing section 11 as the retrieval result list. Since further operation is similar to the one of the first embodiment described above, its description is omitted.

As described above, according to the second embodiment, the apparatus A for retrieving and delivering the content is configured such that, as in the case of the first embodiment described above, the retrieval result list resulting from retrieval and the content specified by the user can be readily displayed or output by the various terminals each of which has different processing ability, based upon the processing ability of the terminal D, and at the same time, the apparatus A for retrieving and delivering the content according to the second embodiment further comprises the retrieving metadata generating section 41 so that the terminal D does not need to have the retrieving metadata generating section 26, and therefore the terminal D may have smaller circuit configuration.

Third Embodiment

Though, in the description of the apparatus A for retrieving and delivering the content according to the first and second embodiments, the contents and the registering metadata are stored in the database B, an apparatus A for retrieving and delivering contents according a third embodiment is configured such that link information to the contents is stored in the database B on behalf of the contents themselves, when the contents reside on the network C, that is, for example, the contents are stored in other databases, servers and so on that can be accessed via the network C.

Figure 10:
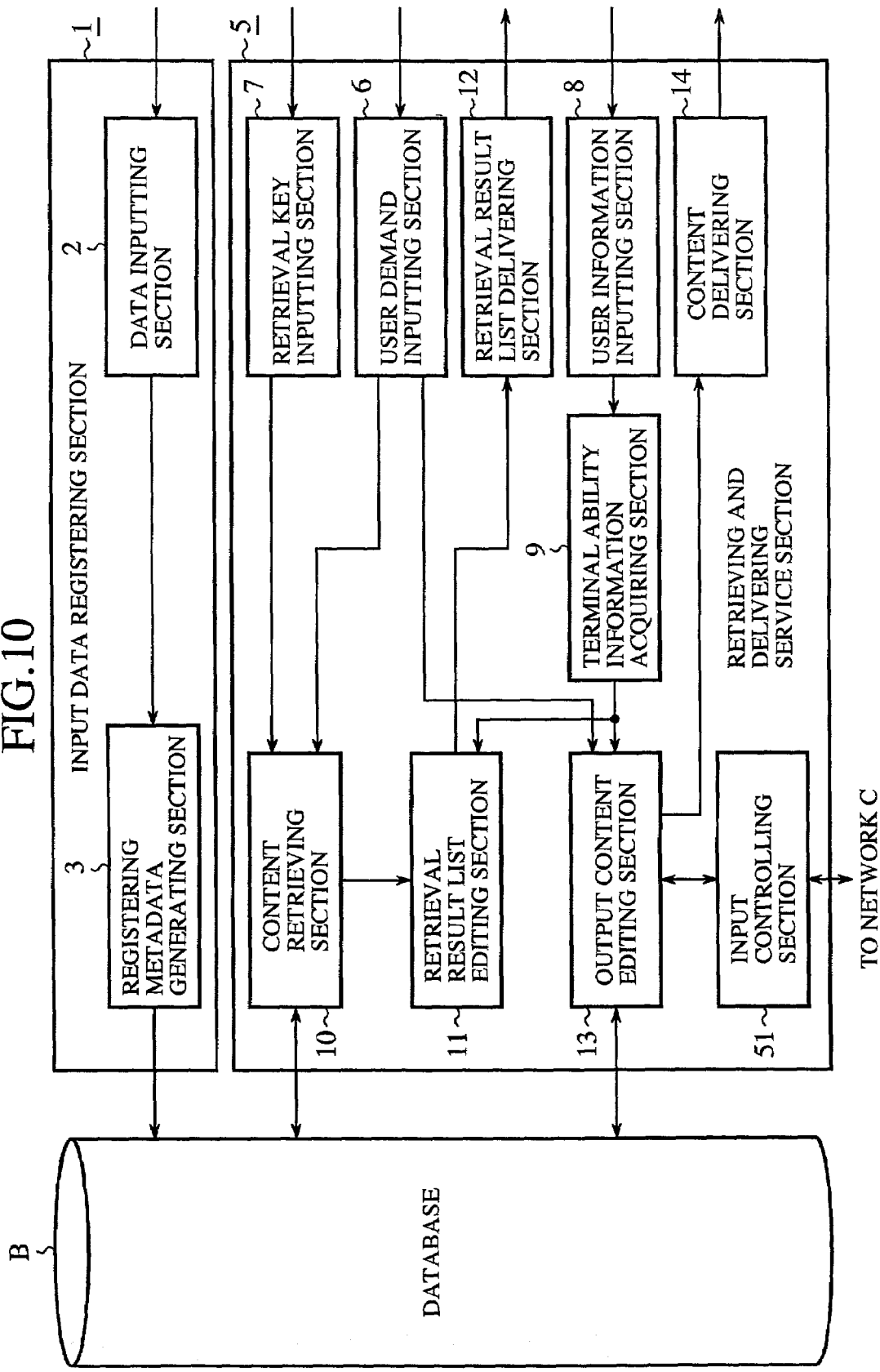
FIG. 10 is a diagram showing the configuration of the apparatus A for retrieving and delivering the contents according to a third embodiment.

FIG. 10 is a diagram showing the configuration of the apparatus A for retrieving and delivering the content according to the third embodiment. In FIG. 10, an input controlling section 51 inputs the content from the network C and outputs the content to the output content editing section 13 when the link information to the content is input to the output content editing section 13 from the database B. Since other elements are similar to the ones in the apparatus A for retrieving and delivering the content of the first embodiment shown in FIG. 2, like elements are given like reference numerals and description of these elements is omitted.

Next, an operation of the apparatus A will be described.

To begin with, the process of the input data registering section 1 according to the third embodiment will be described in detail.

Figure 11:
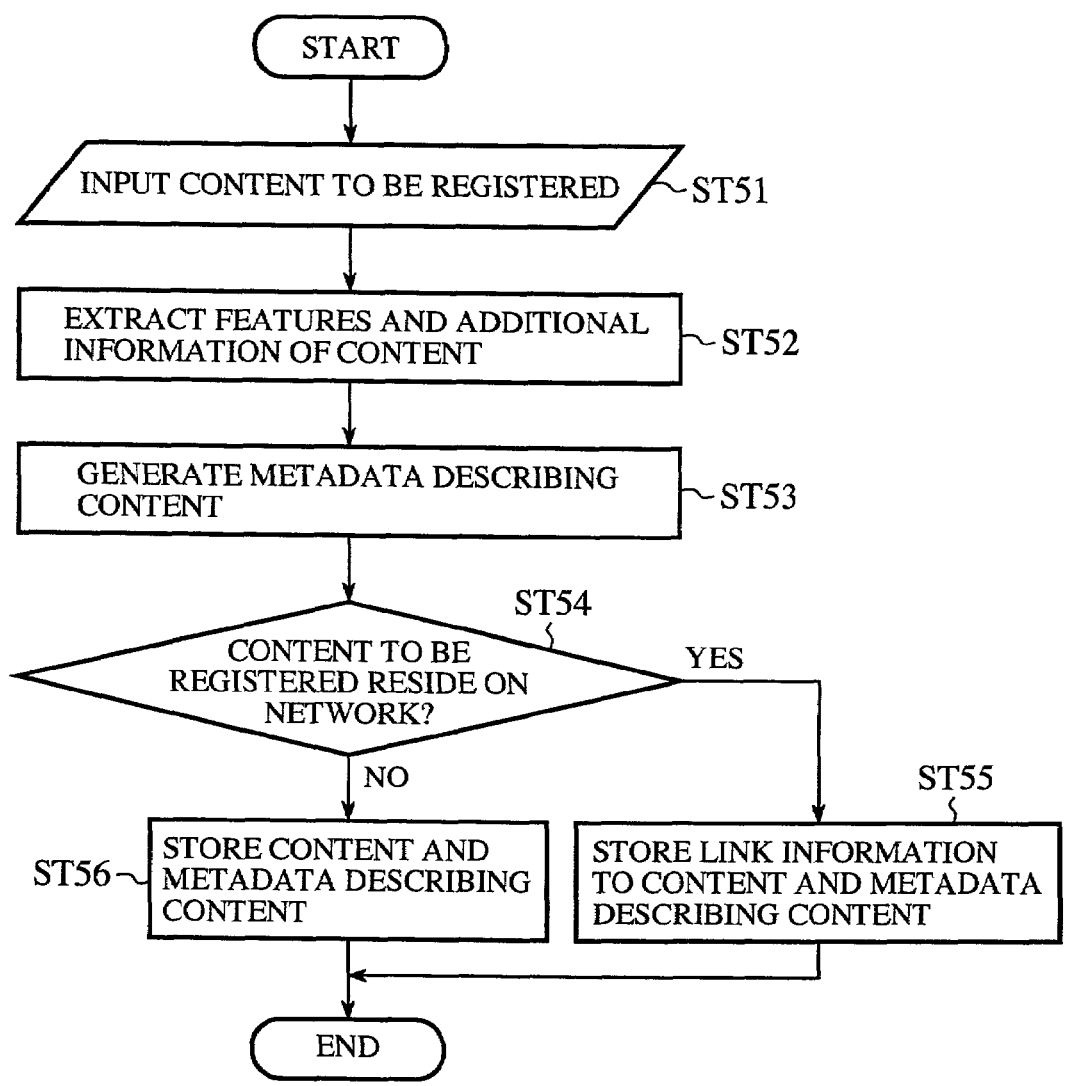
FIG. 11 is a flowchart showing the process of the input data registering section 1 in the apparatus A for retrieving and delivering the contents of the third embodiment for registering new contents in the database B.

FIG. 11 is a flowchart showing the process of the input data registering section 1 when a new content is registered in the database B by the apparatus A for retrieving and delivering the content according to the third embodiment.

First, the data inputting section 2, that comprises either one or both of an interface for downloading and inputting the content via the network C and the other interface for inputting the content directly using any tool (not shown) and the like connected to the apparatus without the network C, inputs the content either from the network C, or from outside without the network C and outputs the content to the registering metadata generating section 3 (Step ST51).

The registering metadata generating section 3 extracts information such as features, additional information and the like from the input content (Step ST52) and generates registering metadata (a feature descriptor) that describes the information such as the extracted features, the additional information and the like in a predefined format (Step ST53). It is to be noted that the process up to this step is similar to the one in the first and second embodiments.

Next, in the third embodiment, it is determined whether the content input through the data inputting section 2 to be registered in the database B has resided on the network C and have been input from the network C, or the content has not been on the network C but input directly (Step ST54).

Here, if it is determined that the registered content has been input from the network C (Step ST54 "Yes"), the registering metadata generating section 3 stores the link information to download or otherwise acquire the pertinent content residing on the network C and the registering metadata for the content in the database B (Step ST55), on the other hand, if it is determined that the registered content has not resided on the network C but has been input directly (Step ST54 "No"), the registering metadata generating section 3 stores the pertinent content themselves and the registering metadata for the content in the database B (Step ST56).

Next, the process of the retrieving and delivering service section 5 of the apparatus A for retrieving and delivering the content according to the third embodiment will be described in detail.

Figure 12:
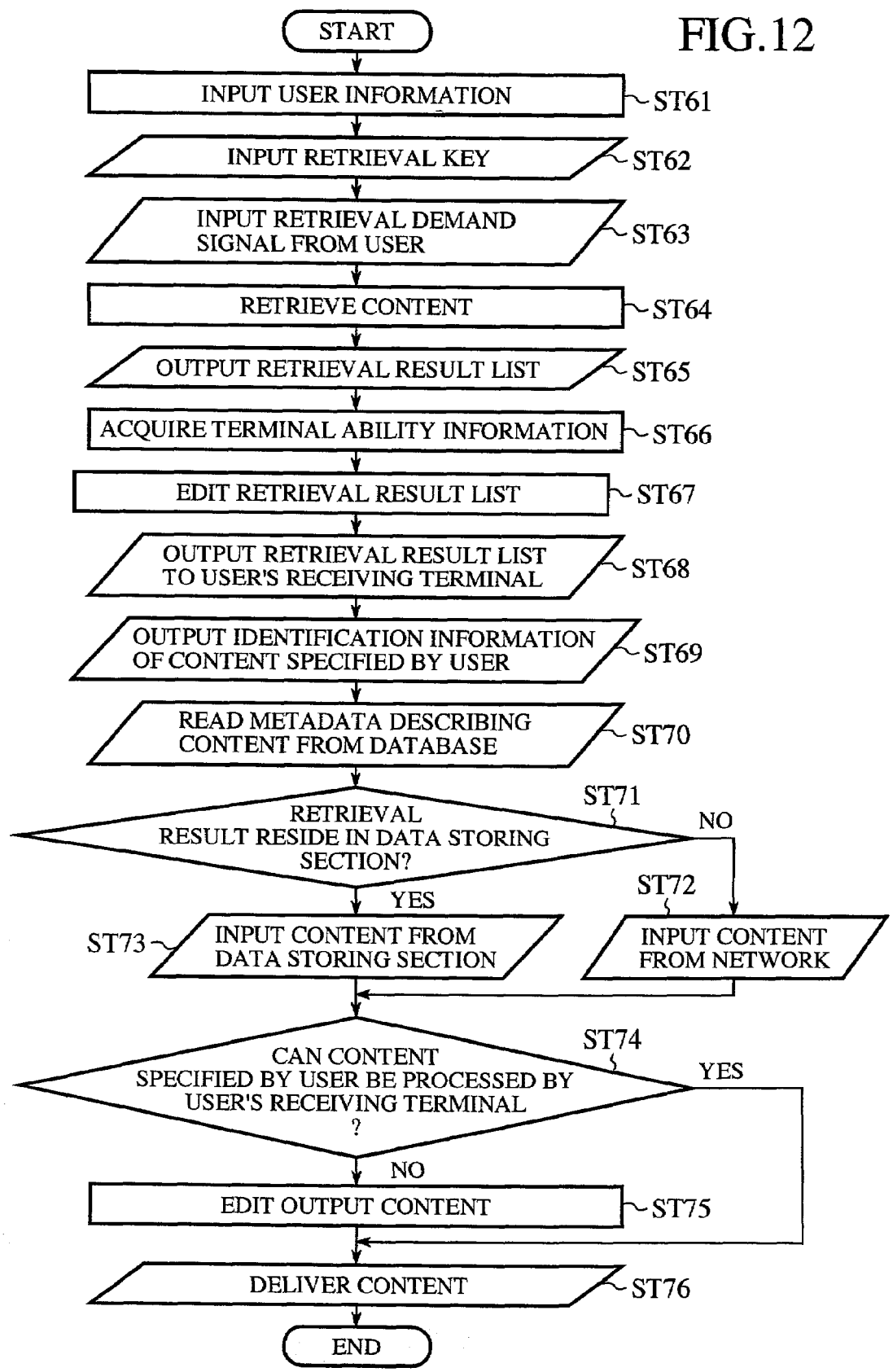
FIG. 12 is a flowchart showing the process of the retrieving and delivering service section 5 in the apparatus A for retrieving and delivering the contents of the third embodiment.

FIG. 12 is a flowchart showing the process of the retrieving and delivering service section 5 of the apparatus A for retrieving and delivering the content according to the third embodiment.

First, user information about the user is input from the terminal D to the user information inputting section 8 of the apparatus A for retrieving and delivering the content (Step ST61), and then retrieval keys including content retrieving metadata, user retrieval keys and the like are input from the terminal D to the retrieval key inputting section 7 of the apparatus A for retrieving and delivering the content (Step ST62), and then a retrieval demanding signal that demands retrieval is further input from the terminal D to the user demand inputting section 6 of the apparatus A for retrieving and delivering the content (Step ST63).

When the retrieval demanding signal and the retrieval keys are input, the content retrieving section 10 matches the input retrieval keys with the keyword and the features described in the registering metadata included in the database B (Step ST64), extracts the additional information stored along with each of one or more contents that consistent with or similar to the input retrieval keys, and outputs a list of the additional information as the retrieval result list to the retrieval result list editing section 11 (Step ST65).

On the other hand, the user information input to the user information inputting section 8 is sent to the terminal ability information acquiring section 9 and the information about the processing ability of the terminal D that is included in the user information is acquired by the terminal ability information acquiring section 9 (Step ST66). Here, it is to be noted that, when the apparatus A for retrieving and delivering the content has user registration function, it may be configured so that the user information is not sent from the terminal D to the apparatus A for retrieving and delivering the content, and at this time, information about the receiving terminal of the user may be registered in the apparatus A upon user registration in advance, the terminal ability information registered in the apparatus A for retrieving and delivering the content may be acquired by referring to the user identification or other information.

Then, the retrieval result list extracted from the database B and output by the content retrieval section 10 is output to the retrieval result list editing section 11.

The retrieval result list editing section 11, based upon the terminal ability information from the terminal ability acquiring section 9, edits the retrieval result list, that is, extracts only the information that can be received and displayed or otherwise output on the terminal D from the information included in the retrieval result list and so on (Step ST67), and delivers the edited retrieval result list from the retrieval result list outputting section 12 to the terminal D via the network C (Step ST68).

In the terminal D, the retrieval result list from the apparatus A for retrieving and delivering the content is input through the retrieval result list inputting section 30 and displayed on the retrieval result list displaying section 31.

Then, the user specifies a particular content from the contents listed in the retrieval result list displayed on the retrieval result displaying section 31 through the user command inputting section 22 and send the identification information as a user demand from the user demand outputting section 28 to the apparatus A for retrieving and delivering the content via the network C.

In the apparatus A for retrieving and delivering the content, the user demand from the terminal D is input to the retrieving and delivering service section 5 through the user demand inputting section 6 and output to the output content editing section 13 (Step ST69). The process up to this step is similar to the one in the retrieving and delivering service section 5 of the apparatus A for retrieving and delivering the content according to the first embodiment shown in FIG. 4.

Next, the output content editing section 13 of the third embodiment reads only the registering metadata specified by the content identification information input to the user demand inputting section 6 (Step ST70). It is because of the fact that, in the third embodiment, the content specified by the content identification information either may be stored in the database B, or may reside on the network C, that is, for example, the content themselves may be stored in other databases, servers and the like that are accessible via the network C and, on the other hand, the link information to the content residing on the network C may be stored in the database B.

For this reason, in the apparatus A for retrieving and delivering the content of the third embodiment, the output content editing section 13 determines whether or not the content that has been specified by the content identification information and are to be retrieved are stored in the database B (Step ST71).

Then, if the content to be retrieved are not stored in the database B (Step ST71 "No"), the content to be retrieved should reside on the network C, and therefore the output content editing section 13 inputs the content specified by the user by downloading or otherwise acquiring the content from the network C through the input controlling section 51 (Step ST72). On the other hand, if the content to be retrieved are stored in the database B (Step ST71 "Yes"), the output content editing section 13 reads and inputs the content specified by the user from the database B (Step ST73).

Then, in both cases, the output content editing section 13 determines whether or not the content that has been specified by the user and read from either the database B or the network C can be received and displayed or otherwise output by the terminal D, based upon the terminal ability information acquired by the terminal ability information acquiring section 9 (Step ST74).

Then, if it is determined that the input content can be received and displayed or otherwise output by the terminal D (Step ST74 "Yes"), the output content editing section 13 outputs the input content to the content delivering section 14 and the content delivering section 14 delivers the content received from the output content editing section 13 to the terminal D (Step ST76).

In contrast, if it is determined that the input content cannot be received and output by the terminal D (Step ST74 "No"), the output content editing section 13 edits the input content by transforming or otherwise processing the content into a form that can be received and output by the corresponding terminal D (Step ST75), and outputs the edited content to the content delivering section 14. The content delivering section 14 delivers the content that the content editing section 13 have transformed or otherwise edited into the form that can be received and output by the terminal D to the corresponding terminal D (Step ST76).

As described above, according to the third embodiment, as in the case of the first and second embodiments also described above, the apparatus A for retrieving and delivering the content edits the content specified by the user into the form that can be received and output by the terminal D based upon the processing ability of the terminal D, and therefore the content specified to deliver as a result of retrieval can be readily output by various terminals each of which has different processing ability.

In Particular, in the third embodiment, since the contents that reside on the network C are not stored in the database B, and, on behalf of the contents themselves, the link information to the content is stored in the database B, more contents can be registered in the database B of the apparatus A for retrieving and delivering the content.

Fourth Embodiment

Though in the above description of the first, second and third embodiments, matching to a retrieve content is performed without assigning weights to features described in metadata, an apparatus for retrieving and delivering contents according to a fourth embodiment is configured such that a content is retrieved by extracting features of different types described in the metadata, calculating a feature coefficient by summing each of the features with weighting, and then matching the content with the feature coefficient acquired by the above summing.

Though it is to be noted that the fourth embodiment may be applied to any of the first, second and third embodiments described above, here only distinctive operation of the fourth embodiment will be described taking the apparatus A for retrieving and delivering the content of the first embodiment shown in FIG. 2 as an example.

To begin with, an operation of the input data registering section 1 to register content will be described.

When the content is registered in the database B, the registering metadata generating section 3 of the apparatus A for retrieving and delivering the content according to the fourth embodiment extracts features of different types from the content, acquires a weight coefficient corresponding to each of the extracted features by means of a weight coefficient table prepared in advance and the like, calculates weighted features by multiplying the acquired features by the weight coefficient, and finally calculates a feature coefficient by summing the weighted features.

FIG. 13 shows an example of a weight coefficient table of the fourth embodiment. In the fourth embodiment, since a list of weight coefficients that correspond to each type of features such as "an averaged value of hue components of images", "horizontal components of averaged motion vectors of objects included in images" and the like as shown in FIG. 13 is prepared, the weighted features are acquired by multiplying the features extracted when the contents are input by the weight coefficient that is in the list of FIG. 13 and corresponds to each of the features, and then the feature coefficient is calculated by summing the calculated weighted features. The feature coefficient may be stored, for example, in the database B along with the contents or the link information to the contents.

Next, an operation of the retrieving and delivering service section 5 to retrieve the content will be described.

When the content retrieving section 10 retrieves the content in the database B, the feature coefficient is acquired in a manner similar to the one described above, that is, by summing features of different types included in the retrieval keys input to the content retrieving section 10 with weighting, using the same weight coefficient table as the one that is used to register the content. Then the content retrieving section 10 retrieves the content by matching the feature coefficient acquired above with the feature coefficient registered in the database B. The subsequent operation after that is similar to the one in the first embodiment.

As described above, the apparatus A for retrieving and delivering the content in accordance with the fourth embodiment can readily display or output the retrieval result list acquired as a result of retrieval in the database B and the content read from the database B on the various terminals D each of which has different processing ability as in the case of the first or other embodiments described above, and at the same time, it can retrieve the content quickly since it registers the feature coefficient or feature vector that has been acquired by summing the features of the content with weighting in the database B, and it retrieves the content using the feature coefficient or feature vector.

Though the apparatus A for retrieving and delivering the content of the fourth embodiment is described as being applied to the first embodiment, it is to be noted that the apparatus can be also applied, of course, to the second and third embodiments.

Further, in the description of the apparatus A for retrieving and delivering the content of the fourth embodiment, though a sum of weighted features acquired by multiplying a weight coefficient is used to retrieve the content as a feature coefficient, the present invention should not be limited to such configuration, that is, for example, a plurality of feature coefficients may be acquired by summing a plurality of weighted features one by one or some by some, and the content may be retrieved by using a feature vector that uses the plurality of weighted features as its coefficient.

Still further, in the description of the apparatus A for retrieving and delivering the content of the fourth embodiment, though the feature coefficient or feature vector is registered upon registration of data, the present invention should not be limited to such configuration, that is, for example, it may be configured, of course, so as to acquire a quantized coefficient or a quantized vector by quantizing the feature coefficient or feature vector and then register an index corresponding to the quantized coefficient or the quantized vector.

INDUSTRIAL APPLICABILITY

As described above, the apparatus and the method for retrieving and delivering the content according to the present invention are suitable for delivering the content and the retrieval result list acquired as a result of retrieval in various types of formats corresponding to various terminals each of which has different processing ability via various networks such as a telephone line, a wireless network and so on.

What is claimed is:

1. An apparatus for retrieving and delivering a content, wherein the apparatus searches a database where contents and additional information describing the contents are stored based upon information form a terminal and delivers a retrieval result list as a result of the search to said terminal, the retrieval result list identifying a list of candidates of content items for delivery to said terminal as a result of the search, wherein the retrieval result list resulting from said search is formatted to be compatible with determined processing capabilities of said terminal, wherein the apparatus delivers a content item chosen from among the candidates in the retrieval result list, and wherein the chosen content item is also formatted to be compatible with the determined processing capabilities of said terminal, the apparatus comprising:

a content retrieving section that searches said database to acquire each of the contents satisfying a search condition based upon the information from said terminal, extracts the additional information describing each of the contents acquired as a result of the search, and outputs a retrieval result list in which the extracted additional information is published;

a retrieval result list formatting section that, based on information received from said terminal, formats the retrieval result list obtained from said content retrieving section into any format that can be processed on a particular terminal depending upon the processing capabilities of said terminal; and a retrieval result list delivering section that delivers the retrieval result list formatted by said retrieval result list editing section to said terminal before delivering a content item to said terminal as a result of the search, wherein at least one of the content retrieving section, the retrieval list formatting section, and the retrieval list delivering section is executed by a processor in the apparatus.

2. The apparatus for retrieving and delivering a content according to claim 1, wherein:

said database stores weighted registering metadata as said additional information; and said content retrieving section searches said database with reference to said registering metadata based upon the information obtained from said terminal and extracts the additional information of the content acquired as a result of said search.

3. The apparatus for retrieving and delivering a content according to claim 2, further comprising a retrieving metadata generating section that generates metadata for retrieving the content based upon the information from said terminal and outputs it to said content retrieving section, wherein:

said content retrieving section searches said database based upon the information from said terminal and the metadata from said retrieving metadata generating section, extracts the additional information of the content acquired as a result of the search, and outputs the retrieval result list in which the additional information is published.

4. The apparatus for retrieving and delivering a content according to claim 3, comprising:

an output content formatting section that reads the chosen content item from said database based upon the information from said terminal and formats the read content item into any format that can be processed on the particular terminal depending upon the processing capabilities of said terminal; and a content delivering section that delivers the chosen content item formatted by said output content formatting section to said terminal.

5. The apparatus for retrieving and delivering contents according to claim 4, wherein:

said database either stores contents and registering metadata for the particular contents, or stores link information to contents and registering metadata for the particular contents, and said output content formatting section further reads said link information from said database based upon the information from said terminal and then reads a content based upon said link information.

6. The apparatus for retrieving and delivering a content according to claim 2, comprising:
- an output content formatting section that reads the chosen content item from said database based upon the information from said terminal and formats the read content item into any format that can be processed on the particular terminal depending upon the processing capabilities of said terminal; and
- a content delivering section that delivers the chosen content item formatted by said output content formatting section to said terminal.

7. The apparatus for retrieving and delivering a content according to claim 6, wherein:
- said database either stores contents and registering metadata for the particular contents, or stores link information to contents and registering metadata for the particular contents, and
- said output content formatting section further reads said link information from said database based upon the information from said terminal and then reads a content based upon said link information.

8. The apparatus for retrieving and delivering a content according to claim 1, further comprising a retrieving metadata generating section that generates metadata for retrieving the content based upon the information form said terminal anti outputs it to said content retrieving section, wherein:
- said content retrieving section searches said database based upon the information from said terminal and the metadata from said retrieving metadata generating section, extracts the additional information of the content acquired as a result of the search, and outputs the retrieval result list in which the additional information is published.

9. The apparatus for retrieving and delivering a content according to claim 8, comprising:
- an output content formatting section that reads the chosen content item from said database based upon the information from said terminal and formats the read content item into any format that can be processed on the particular terminal depending upon the processing capabilities of said terminal; and
- a content delivering section that delivers the chosen content item formatted by said output content formatting section to said terminal.

10. The apparatus for retrieving and delivering a content according to claim 9, wherein:
- said database either stores contents and registering metadata for the particular contents, or stores link information to contents and registering metadata for the particular contents, and
- said output content formatting section further reads said link information from said database based upon the information from said terminal and then reads a contents based upon said link information.

11. The apparatus for retrieving and delivering a content according to claim 1, comprising:
- an output content formatting section that reads the chosen content item from said database based upon the information from said terminal and formats the read content item into any format that can be processed on the particular terminal depending upon the processing capabilities of said terminal; and
- a content delivering section that delivers the chosen content item formatted by said output content formatting section to said terminal.

12. The apparatus for retrieving and delivering a content according to claim 11, wherein:
- said database either stores contents and registering metadata for the particular contents, or stores link information to contents and registering metadata for the particular contents, and
- said output content formatting section further reads said link information from said database based upon the information from said terminal and then reads a contents based upon said link information.

13. A method for retrieving and delivering a content, wherein the method searches a database where contents and additional in formation describing the contents are stored based upon information from a terminal and delivers a retrieval result list as a result of the search to said terminal, the retrieval result list identifying a list of candidates of content items for delivery to said terminal as a result of the search, wherein the retrieval result list resulting from said search is formatted to be compatible with determined processing capabilities of said terminal, wherein the method delivers a content item chosen from among the candidates in the retrieval result list, and wherein the chosen content item is also formatted to be compatible with the determined processing capabilities of said terminal, the method comprising:
- searching said database to acquire each of the contents satisfying a search condition based upon the information from said terminal;
- extracting the additional information describing each of the contents acquired as a result of the search;
- outputting a retrieval result list in which the extracted additional information is published;
- formatting, based upon the information from said terminal, the retrieval result list obtained from said content retrieving section into any format that can be displayed on a particular terminal depending upon the processing capabilities of said terminal; and
- delivering the retrieval result list formatted by said retrieval result list formatting to said terminal before delivering a content item to said terminal as a result of the search.

14. A method for searching a database, the database storing content items associated with weighted registering metadata, comprising:
- searching the database using search criteria received from the terminal and the weighted registering metadata;
- retrieving data from the database as a result of the searching;
- determining output capabilities of the terminal based on information received from the terminal;
- formatting the retrieved data to be compatible with the determined processing capabilities; and
- sending the retrieval result list to the terminal,
- wherein
  - the weighted registering metadata for each content item in the database includes one or more features, each feature having a corresponding weight coefficient,
  - a feature coefficient for each content item is calculated by multiplying each of the content item's features by the corresponding weight coefficient, and summing the multiplied features, and
  - the searching further comprises:
    - extracting features from the search criteria;
    - multiplying each extracted feature by a corresponding weight coefficient;

summing the multiplied extracted features to obtain a search feature coefficient; and comparing the search feature coefficient to the feature coefficients of the content items to obtain a retrieval result list identifying one or more content items.

15. The method of claim 14, further comprising:
determining output capabilities of the terminal based on information received from the terminal;
formatting the retrieval result list to be compatible with the determined processing capabilities; and
sending the formatted retrieval result list to the terminal.

* * * * *